(12) United States Patent
Baughman et al.

(10) Patent No.: US 12,505,670 B2
(45) Date of Patent: Dec. 23, 2025

(54) PERSONALIZED AGGREGATION OF VOLUMETRIC VIDEOS

(71) Applicant: International Business Machines Corporation, Armonk, NY (US)

(72) Inventors: Aaron K. Baughman, Cary, NC (US); Sarbajit K. Rakshit, Kolkata (IN); Micah Forster, Round Rock, TX (US); Kavitha Hassan Yogaraj, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 297 days.

(21) Appl. No.: 18/084,053

(22) Filed: Dec. 19, 2022

(65) Prior Publication Data

US 2024/0203121 A1    Jun. 20, 2024

(51) Int. Cl.
*G06V 20/40* (2022.01)
*G06V 10/22* (2022.01)
*G06V 10/764* (2022.01)

(52) U.S. Cl.
CPC ............ *G06V 20/41* (2022.01); *G06V 10/235* (2022.01); *G06V 10/764* (2022.01); *G06V 20/46* (2022.01)

(58) Field of Classification Search
CPC .... G06V 20/41; G06V 10/235; G06V 10/764; G06V 20/46
See application file for complete search history.

(56) References Cited

U.S. PATENT DOCUMENTS

| | | | |
|---|---|---|---|
| 10,469,873 B2 | 11/2019 | Pang et al. | |
| 2016/0205419 A1 | 7/2016 | Ricci et al. | |
| 2016/0379055 A1 | 12/2016 | Loui et al. | |
| 2020/0169715 A1* | 5/2020 | Liu | H04N 13/117 |
| 2020/0169717 A1 | 5/2020 | Zavesky et al. | |
| 2020/0336722 A1 | 10/2020 | Gibbon et al. | |
| 2020/0413157 A1* | 12/2020 | Rothschild | H04N 21/21805 |

(Continued)

FOREIGN PATENT DOCUMENTS

| | | |
|---|---|---|
| CN | 114830676 A | 7/2022 |
| CN | 120345236 A | 7/2025 |

(Continued)

OTHER PUBLICATIONS ip.com, Method and System for Metaverse Collaboration for Microscopic Object Analysis, Jul. 25, 2022.

(Continued)

*Primary Examiner* — Dhaval V Patel
(74) *Attorney, Agent, or Firm* — Garg Law Firm, PLLC; Rakesh Garg; Lily Neff

(57) ABSTRACT

An embodiment includes selecting, using a first attribute of a first object, the first object in a first volumetric video. The embodiment also includes selecting, using a second attribute of a second object, the second object in a second volumetric video, where the first attribute and the second attribute satisfy an aggregation rule. The embodiment also includes generating an aggregated volumetric video from the first volumetric video and the second volumetric video, where the generating of the aggregated video comprises rendering the first object and the second object simultaneously in the aggregated volumetric video based on the aggregation rule.

16 Claims, 9 Drawing Sheets

(56) References Cited

U.S. PATENT DOCUMENTS

| | | | |
|---|---|---|---|
| 2021/0212658 A1 | 7/2021 | McGrath et al. | |
| 2021/0225079 A1 | 7/2021 | Horsman et al. | |
| 2021/0266513 A1 | 8/2021 | Liu et al. | |
| 2022/0038635 A1 | 2/2022 | Hutsler et al. | |
| 2023/0026014 A1 | 1/2023 | Brandt et al. | |
| 2024/0293077 A1* | 9/2024 | Kumar | A61B 5/4839 |

FOREIGN PATENT DOCUMENTS

| | | |
|---|---|---|
| EP | 3801284 A1 | 4/2021 |
| WO | 2024/131437 A1 | 6/2024 |

OTHER PUBLICATIONS

Zhang et al., Innovating Multi-user Volumetric Video Streaming through Cross-layer Design, HotNets '21, pp. 16-22, Nov. 10-12, 2021.

IBM, Canon, Inc. and IBM Launch Collaboration in Entertainment and the Arts in Japan, Jul. 15, 2021, https://newsroom.ibm.com/2021-07-15-Canon,-Inc-and-IBM-Launch-Collaboration-in-Entertainment-and-the-Arts-in-Japan.

Cohen, Welcome to the Netaverse, Where Brooklyn Nets Players Can Be Seen in a Whole New (3D) Light, Feb. 3, 2022, https://www.sporttechie.com/welcome-to-the-netaverse-where-brooklyn-nets-players-can-be-seen-in-a-whole-new-3d-light.

Antunes, Canon and IBM: using volumetric video to promote visual arts, Jul. 13, 2021, https://www.provideocoalition.com/canon-and-ibm-using-volumetric-video-to-promote-visual-arts/.

Canon, Canon and IBM Japan Form Joint Business Operation Utilizing Volumetric Video Technology to Promote the Visual and Performing Arts, Jul. 7, 2021, https://sg.canon/en/consumer/form-joint-utilizing-volumetric-video-technology/news.

Perkins, The business benefits of volumetric video, Jun. 17, 2021, https://business.bt.com/insights/the-future-is-now/transforming-industries-with-volumetric-video/.

Qian et al., Toward Practical Volumetric Video Streaming on Commodity Smartphones, HotMobile '19: Proceedings of the 20th International Workshop on Mobile Computing Systems and Applications, Feb. 27-28, 2019, pp. 135-140.

Zerman et al., A Case Study on the Use of Volumetric Video in Augmented Reality for Cultural Heritage, NordiCHI '20, Oct. 25-29, 2020.

Khan et al., Can Accurate Future Bandwidth Prediction Improve Volumetric Video Streaming Experience?, 2021 International Wireless Communications and Mobile Computing (IWCMC), Jun. 28, 2021-Jul. 2, 2021.

Diaz et al., Region Dependent Mesh Refinement for Volumetric Video Workflows, 2019 International Conference on 3D Immersion (IC3D), Dec. 11, 2019.

Xu et al., Mutual Information in 3D Video, 2007 3DTV Conference, May 7-9, 2007.

Gul et al., Low-latency Cloud-based Volumetric Video Streaming Using Head Motion Prediction, Nossdav'20, Jun. 10-11, 2020.

International Searching Authority, PCT/CN2023/133903, Feb. 6, 2024.

* cited by examiner

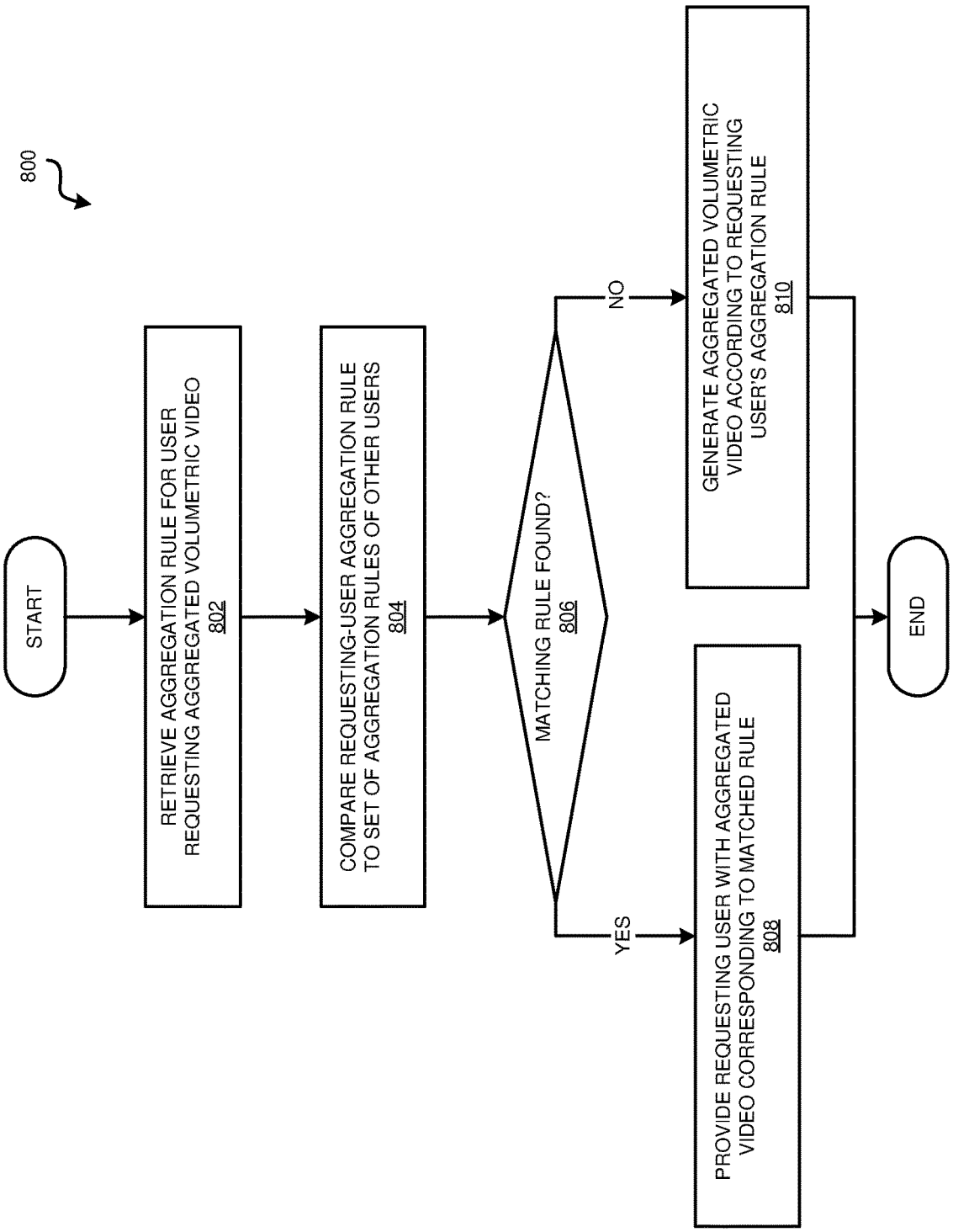

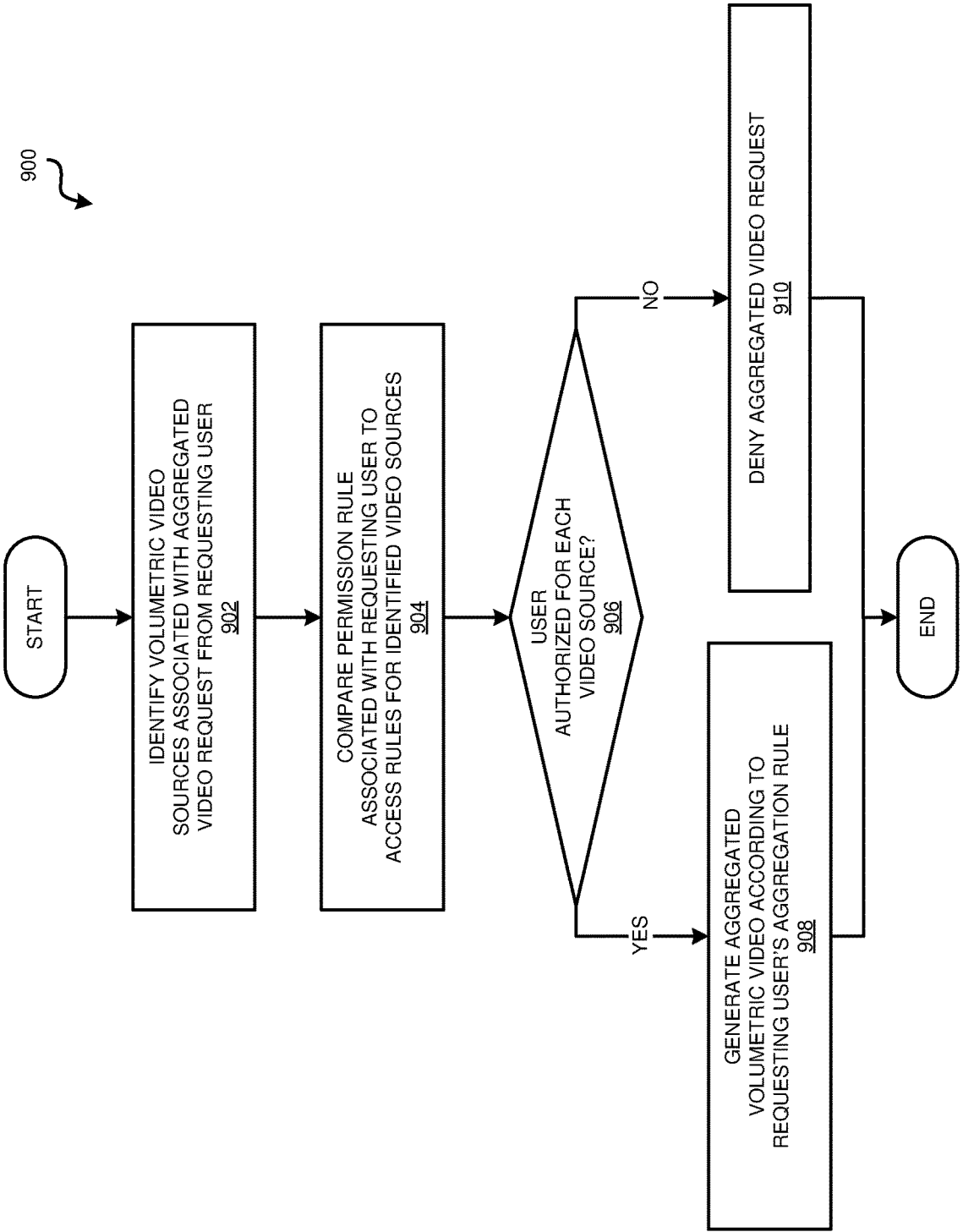

PERSONALIZED AGGREGATION OF VOLUMETRIC VIDEOS

BACKGROUND

The present invention relates generally to volumetric video processing. More particularly, the present invention relates to a method, system, and computer program for personalized aggregation of volumetric videos.

Immersive technologies continue to gain popularity, particularly as related consumer devices, such as virtual reality (VR) headsets, continue to decline in price. The growth of consumer adoption of such technologies has led to growth on the content side as content creators have responded to consumer interest in new immersive experiences. In addition, advances in video capturing technologies have allow content creators to increase the "immersiveness" of the content.

Immersive video content is generally captured using multiple cameras from different angles simultaneously or using one camera from multiple locations and angles. One example of immersive filming is so-called 360° filming. The resulting 360° video content is generally created by a computer by stitching a number of images with limited fields of view, but captured simultaneously, together to form an entire sphere of still or video images in which an individual can stand. It is most easily viewed by an individual with a VR headset, but can also be viewed by other methods. It is also somewhat limited because the individual perspective in scenes is fixed relative to the images themselves. In other words, a viewer may only view such scenes from a position selected by a filmmaker and thereby restricts movement within the scene. Viewers can look around in all directions, but they cannot move from the physical camera's position. Additionally, conventional 360° video content sacrifices depth and volume content, because it is effectively a sphere with a viewer at the center and pictures posted along the interior walls of that sphere. There are no objects within the scene that have a shape other than this spherical wall. This further reduces how immersive the experience is by restricting the viewer's experience.

Volumetric video is distinguished from 360° video in that the volumetric video uses photogrammetry or depth of field sensors (e.g., light field arrays, LIDAR) to capture depth information as well. This information results in volumetric video capturing both the images of the scene and overall three-dimensional parameters of objects in the scene. So, for example, a chair within a given volumetric video scene may have both a shape (e.g., a three-dimensional geometric shape corresponding to that of the chair), and images superimposed thereover to create the impression that it is made of wood, or metal, or plastic, or whatever the case may be. Therefore, in volumetric video, a viewer can generally freely move within the scene, overcoming movement restrictions of conventional two-dimensional or 360° video filming techniques. Content produced using these techniques is often referred to as volumetric, six degrees of freedom (6DoF), light-field, or free-viewpoint video.

SUMMARY

The illustrative embodiments provide for personalized aggregation of volumetric videos. An embodiment includes selecting, using a first attribute of a first object, the first object in a first volumetric video. The embodiment also includes selecting, using a second attribute of a second object, the second object in a second volumetric video, where the first attribute and the second attribute satisfy an aggregation rule. The embodiment also includes generating an aggregated volumetric video from the first volumetric video and the second volumetric video, where the generating of the aggregated video comprises rendering the first object and the second object simultaneously in the aggregated volumetric video based on the aggregation rule. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

FIG. 8 depicts a flowchart of an example process for aggregating volumetric videos using an aggregation optimization technique in accordance with an illustrative embodiment; and FIG. 9 depicts a flowchart of an example process for aggregating volumetric videos using a security technique in accordance with an illustrative embodiment.

DETAILED DESCRIPTION

Figure 1:
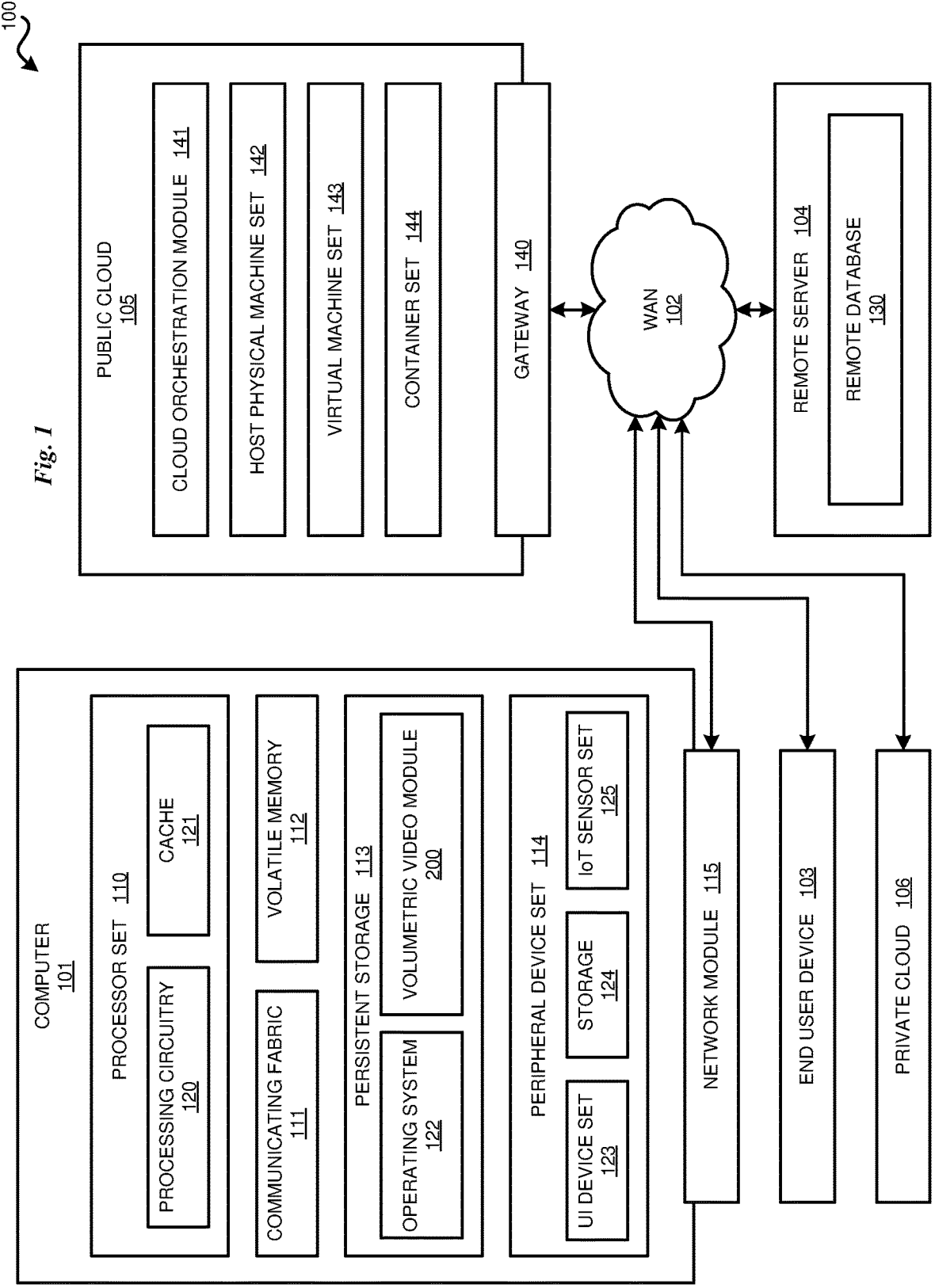
FIG. 1 depicts a block diagram of a computing environment in accordance with an illustrative embodiment.

Volumetric video is distinguished from 360° video in that the volumetric video includes depth information. This added depth information dramatically changes the way the content can be consumed. When viewing a scene in 360° video format, the viewer is locked into a single position, and from that single vantage point, the viewer may have up to three degrees of freedom that correspond to rotations about each of the three orthogonal axes of a cartesian coordinate system: roll (tilting the head left or right), pitch (tilting the head forward or backward), and yaw (turning the head left or right).

In contrast, the depth information included with volumetric video frees the viewer from a locked vantage point and allows the viewer to have up to six degrees of freedom that correspond to rotations about, and translations along, each of the three orthogonal axes of a cartesian coordinate system: roll, pitch, and yaw as described above, plus elevating (moving up or down), strafing (moving left or right), and surging (moving forward or backward). As a result, the viewer may be free to move about in a volumetric video scene, observing objects from multiple angles and vantage points. This added freedom of movement significantly increases the immersive nature of content provided in a volumetric video format compared to that of earlier technologies.

However, a limitation of volumetric video that currently exists is that the viewer is still limited to only viewing the volumetric video scene as originally created. That is, the viewer has no control over the content of volumetric video. For example, if a user is remotely attending a conference that is simultaneously occurring in two or more locations from which respective volumetric videos are made available for remote attendees, the user is limited to viewing only one of the two volumetric videos at a time. In other words, the user is unable to select an option that would provide a volumetric video that includes elements of interest from each of the source volumetric videos Disclosed embodiments address these and other limitations of conventional volumetric video systems by providing for an aggregated volumetric video that is an aggregation of two or more source volumetric videos. Disclosed embodiments also provide for personalization of the is personalized of the aggregated volumetric video. For example, in some embodiments, a user specifies one or more aggregation rules.

Aggregation rules are primarily instructions and/or preferences that guide the rendering of two or more source volumetric videos into a single aggregated volumetric video. Aggregation rules may include designations of objects from the source volumetric videos to show or not show in the aggregated volumetric video (e.g., show the audience from the first source in place of the audience from the second source). Aggregation rules may include designations of attributes of objects from the source volumetric videos to show or not show or modify in the aggregated volumetric video (e.g., change the hue of the audience chairs from blue to black; obscure corporate logos on audience members' shirts and hats).

Aggregation rules may include rules of varying degrees of specificity. For example, aggregation rules may include designation of specific attributes, specific objects, or classes of objects, where the classes of objects can vary in terms of specificity. As a more specific non-limiting example, a user creating rules for a personalized aggregated volumetric video may have source volumetric videos from multiple car shows, and in this scenario, rules of varying specificity may include a rule for a broad class of objects such as a preference to view sedans over other types of vehicles; a rule for a more specific class of objects may specify particular makes and models of sedans; and a rule for a specific object may specify a famous car on display in one of the volumetric videos.

In some embodiments, the video aggregation is performed by a volumetric video module. In some such embodiments, the volumetric video module analyzes the digital volumetric video data from two or more source volumetric video. In some such embodiments, this analysis results in identification of one or more objects in each of the source volumetric videos.

In some embodiments, the analysis generates metadata for one or more of the identified objects. In some embodiments, the metadata for an identified object includes data representative of one or more attributes of the identified object. In various embodiments, the number and type of attributes will vary depending on implementation decisions, constraints, and/or preferences. Non-limiting examples of types of attributes include appearance, classification, and/or source attributes. In exemplary embodiments, appearance attributes of an identified object may include size, shape, and/or hue attributes of the identified object.

In exemplary embodiments, classification attributes of an identified object may include one or more classes or categories associated with the identified object. In some embodiments, the classification attribute includes a class (or classes) predicted using known object classification and/or detection techniques.

For example, in some embodiments, object classification techniques include machine learning processes that use trained machine learning models to predict categories of objects in an image. It will be appreciated that "images" as referred to herein include images that are frames of a video. In some embodiments, classification is performed using known semantic image segmentation techniques that classify portions or segments of a volumetric image with a corresponding class of what the portion or segment of the volumetric image represents.

In some embodiments, object detection includes techniques that combine classification with localization techniques, determine the positions of classified objects in an image. Thus, in some embodiments, object detection is performed using known techniques that determine what objects are in an image and specify where the objects are positioned in the image. In some embodiments, object detection includes known instance segmentation techniques that distinguish between separate objects of the same class in an image.

In some embodiments, classification attributes may include multiple classes that are representative of varying degrees of specificity. For example, suppose an identified object is a multi-passenger van, in this example the identified object may include "vehicle" as a first classification attribute, "multi-passenger vehicle" as a second classification attribute, and "van" as a third classification attribute.

In exemplary embodiments, source attributes may include information that identifies the source or sources of volumetric video. As a non-limiting example, suppose an aggregated volumetric video is being generated for a conference that is occurring simultaneously at first and second geographically distant locations. In this example, the aggregated volumetric video is an aggregation of a first volumetric video captured at the first location and a second volumetric video captured at the second location. Thus, a first identified object captured in the first volumetric video may include a source attribute that signifies the first location or the first volumetric video as the source of the first identified object, whereas a second identified object captured in the second volumetric video may include a source attribute that signifies the second location or the second volumetric video as the source of the second identified object.

The set of size and shape attributes may include only a single attribute, as well as two or more attributes. A size and shape attribute is a characteristic, feature, or other property of an object associated with size measurements and/or shapes of one or more portions of an object. A portion of an object may be one part, section, or component of an object. A portion of an object may also include the entire object. A size measurement is any measure of size, such as, without limitation, height, length, and width. A size measurement may also include weight and volume of an object. The set of size and shape attributes may include only size related attributes without any shape related attributes. In another embodiment, the set of size and shape attributes may include only shape related attributes without any size related attributes. In still another embodiment, the set of size and shape attributes comprises both size related attribute(s) and shape related attribute(s).

An embodiment can be implemented as a software application. The application implementing an embodiment can be configured as a modification in an existing manufacturing system, as a separate application that operates in conjunction with an existing manufacturing system, as a standalone system, or some combination thereof.

An embodiment monitors system state data for an indication of a system failure that causes the system kernel to go into a halt state. The state data may vary depending on the type of system (e.g., operating system and hardware), but in general may include system error messages, error codes, log entries, or other data representative of a system error. The system error may also vary depending on the type of system, but in general may include kernel errors, kernel panics, stop errors, or the like that cause partial or complete loss of kernel functionality.

A system failure that causes partial or complete loss of kernel functionality is generally recognized by the system as a condition that requires a reboot of the system for recovery. The loss of kernel functionality typically requires a reboot to recover in most types of systems. Such errors are therefore examples of errors that satisfy a reboot condition.

In illustrative embodiments, when a system error is detected that satisfies a reboot condition (e.g., a system error that causes loss of kernel functionality), debug data is temporarily saved into a protected section of memory. Since at least a portion of kernel functionality will have been lost at this point, the embodiment includes generating and saving a copy of the debug data without the assistance of the kernel. For example, in some embodiments, an exception handler generates and saves the copy of the debug data. The debug data may vary depending on the type of system (e.g., operating system and hardware), but in general may include data from processor memories (e.g., registers and cache), logs, and/or trace arrays.

Since the kernel is in a halted state while the debug data is being generated, this means that kernel functionality for processing the debug data is not available. As a result, the kernel is not available at this time to filter sensitive information from the debug data. For this reason, the debug data is stored in the protected section of memory where it can be retained during a reboot and processed thereafter.

After the reboot has occurred, a debugging device that is an untrusted device to the recovered system connects via an I/O port using a trusted protocol. The untrusted device issues a request for debug data that will be used to try to determine the reason for the system failure. Since the debug data is stored in protected memory, the untrusted device is not able to directly access the debug data. Instead, the untrusted entity must request the debug data from a secure debugging module.

In the illustrated embodiment, the secure debugging module receives the request for debug data. Responsive to the request, the secure debugging module uses a data sanitization module to analyze the debug data using a sensitive data detection/sanitization process that detects and removes sensitive data in the debug data.

In some embodiments, the data sanitization module detects sensitive data according to an audit policy. An audit policy is a set of preferences, rules and/or criteria that protect sensitive data in the debug data. For example, an audit policy may define "sensitive objects" as files or objects that contain particular keywords (e.g., "confidential," or "privileged") and/or are associated with particular keywords (e.g., in metadata) or particular flags (e.g., in metadata identifying a document or email as personal, confidential, etc.). An audit policy may further specify rules for handling sensitive objects. As an example, an audit policy may require that a reviewer approve the transfer of any potentially sensitive objects from the protected memory to the untrusted entity. Thus, in some embodiments, the data protection process includes one or more protective measures in the form of data sanitization to prevent sensitive data from being leaked with debug data sent to the untrusted entity.

In the illustrated embodiment, the window module detects whether sensitive data was being processed during a window of time in which the system error occurred, for example by reviewing system logs. For example, in some embodiments, the window module reviews the system logs using an audit policy that includes a set of preferences, rules and/or criteria that the window module uses to identify sensitive data in the debug data. For example, an audit policy may define "sensitive objects" as files or objects that contain particular keywords (e.g., "confidential," or "privileged") and/or are associated with particular keywords (e.g., in metadata) or particular flags (e.g., in metadata identifying a document or email as personal, confidential, etc.). An audit policy may further specify rules for handling sensitive objects. As an example, an audit policy may require that a reviewer approve the transfer of any potentially sensitive objects from the protected memory to the untrusted entity. Thus, in some embodiments, the data protection process includes one or more protective measures in the form of a time-window analysis to prevent sensitive data from being leaked with debug data sent to the untrusted entity.

In some embodiments, the data sanitization module detects sensitive data according to an audit policy. An audit policy is a set of preferences, rules and/or criteria that protect sensitive data in the debug data. For example, an audit policy may define "sensitive objects" as files or objects that contain particular keywords (e.g., "confidential," or "privileged") and/or are associated with particular keywords (e.g., in metadata) or particular flags (e.g., in metadata identifying a document or email as personal, confidential, etc.). An audit policy may further specify rules for handling sensitive objects. As an example, an audit policy may require that a reviewer approve the transfer of any potentially sensitive objects from the protected memory to the untrusted entity. Thus, in some embodiments, the data protection process includes one or more protective measures in the form of data encryption to prevent sensitive data from being leaked with debug data sent to the untrusted entity.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some of the computer code involved in performing the inventive methods, such as an improved volumetric video module 200 that provides personalized aggregation of volumetric videos. In addition to volumetric video module 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and volumetric video module 200, as identified above), peripheral device set 114 (including user interface (UI) device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in volumetric video module 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in volumetric video module 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
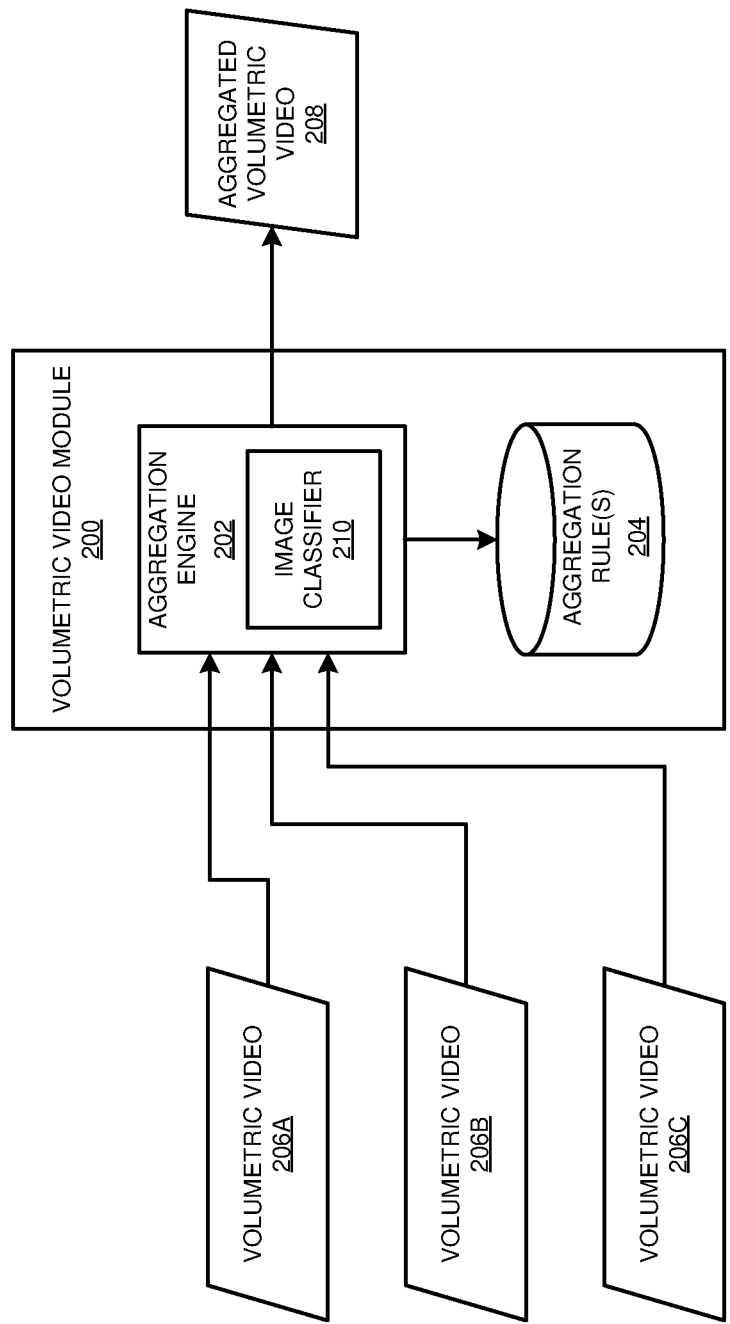
FIG. 2 depicts a functional block diagram of an exemplary volumetric video module in accordance with an illustrative embodiment.

With reference to FIG. 2, this figure depicts a functional block diagram of an exemplary volumetric video module 200 in accordance with an illustrative embodiment. In the illustrated embodiment, the volumetric video module 200 receives a plurality of volumetric videos 206A-206C and aggregates two or more of them into an aggregated volumetric video 208.

In the illustrated embodiment, the volumetric video module 200 includes an aggregation engine 202 and aggregation rule(s) 204 stored in a computer readable storage medium. In alternative embodiments, the volumetric video module 200 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the aggregation engine 202 aggregates individual volumetric videos, such as two or more of volumetric videos 206A-206C, and creates a single aggregated volumetric video 208, also referred to herein as a corridor 208. In some embodiments, the volumetric videos 206A-206C are captured simultaneously from different physical locations. For example, volumetric video 206A may be a live broadcast in a volumetric video format from Los Angeles, volumetric video 206B may be a live broadcast in a volumetric video format from Chicago, and volumetric video 206C may be a live broadcast in a volumetric video format from New York for a conference that is being hosted in these three locations. In some embodiments, the volumetric videos 206A-206C are captured at different times from different physical locations.

Aggregation rules 204 are primarily instructions and/or preferences that guide the rendering of two or more source volumetric videos into a single aggregated volumetric video. Aggregation rules 204 may include designations of objects from the source volumetric videos to show or not show in the aggregated volumetric video (e.g., show the audience from the first source in place of the audience from the second source). Aggregation rules 204 may include designations of attributes of objects from the source volumetric videos to show or not show or modify in the aggregated volumetric video (e.g., change the hue of the audience chairs from blue to black; obscure corporate logos on audience members' shirts and hats).

Aggregation rules 204 may include rules of varying degrees of specificity. For example, aggregation rules 204 may include designation of specific attributes, specific objects, or classes of objects, where the classes of objects can vary in terms of specificity. As a more specific non-limiting example, a user creating rules 204 for a personalized aggregated volumetric video may have source volumetric videos from multiple car shows, and in this scenario, rules 204 of varying specificity may include a rule for a broad class of objects such as a preference to view sedans over other types of vehicles; a rule for a more specific class of objects may specify particular makes and models of sedans; and a rule for a specific object may specify a famous car on display in one of the volumetric videos.

In some embodiments, the aggregation engine 202 performs video aggregation. In some such embodiments, the aggregation engine 202 analyzes the digital volumetric video data from two or more source volumetric videos. In some such embodiments, this analysis results in identification of one or more objects in each of the source volumetric videos.

In some embodiments, the aggregation engine 202 generates metadata for one or more of the identified objects. In some embodiments, the metadata for an identified object includes data representative of one or more attributes of the identified object. In various embodiments, the number and type of attributes will vary depending on implementation decisions, constraints, and/or preferences. Non-limiting examples of types of attributes include appearance, classification, and/or source attributes. In exemplary embodiments, appearance attributes of an identified object may include size, shape, and/or hue attributes of the identified object.

In exemplary embodiments, classification attributes of an identified object may include one or more classes or categories associated with the identified object. In some embodiments, the classification attribute includes a class (or classes) predicted using known object classification and/or detection techniques.

For example, in some embodiments, the aggregation engine 202 includes an image classifier 210 that performs object classification techniques that include machine learning processes that use trained machine learning models to predict categories of objects in an image. It will be appreciated that "images" as referred to herein include images that are frames of a video. In some embodiments, classification is performed using known semantic image segmentation techniques that classify portions or segments of a volumetric image with a corresponding class of what the portion or segment of the volumetric image represents.

In some embodiments, the aggregation engine 202 performs object detection using techniques that combine classification with localization techniques, determine the positions of classified objects in an image. Thus, in some embodiments, the aggregation engine 202 performs object detection using known techniques that determine what objects are in an image and specify where the objects are positioned in the image. In some embodiments, the aggregation engine 202 uses object detection techniques that include known instance segmentation techniques that distinguish between separate objects of the same class in an image.

In some embodiments, classification attributes may include multiple classes that are representative of varying degrees of specificity. For example, suppose an identified object is a multi-passenger van, in this example the identified object may include "vehicle" as a first classification attribute, "multi-passenger vehicle" as a second classification attribute, and "van" as a third classification attribute.

In exemplary embodiments, source attributes may include information that identifies the source or sources of volumetric video. As a non-limiting example, suppose an aggregated volumetric video is being generated for a conference that is occurring simultaneously at first and second geographically distant locations. In this example, the aggregated volumetric video is an aggregation of a first volumetric video captured at the first location and a second volumetric video captured at the second location. Thus, a first identified object captured in the first volumetric video may include a source attribute that signifies the first location or the first volumetric video as the source of the first identified object, whereas a second identified object captured in the second volumetric video may include a source attribute that signifies the second location or the second volumetric video as the source of the second identified object.

The set of size and shape attributes may include only a single attribute, as well as two or more attributes. A size and shape attribute is a characteristic, feature, or other property of an object associated with size measurements and/or shapes of one or more portions of an object. A portion of an object may be one part, section, or component of an object. A portion of an object may also include the entire object. A size measurement is any measure of size, such as, without limitation, height, length, and width. A size measurement may also include weight and volume of an object. The set of size and shape attributes may include only size related attributes without any shape related attributes. In another embodiment, the set of size and shape attributes may include only shape related attributes without any size related attributes. In still another embodiment, the set of size and shape attributes comprises both size related attribute(s) and shape related attribute(s).

Figure 3:
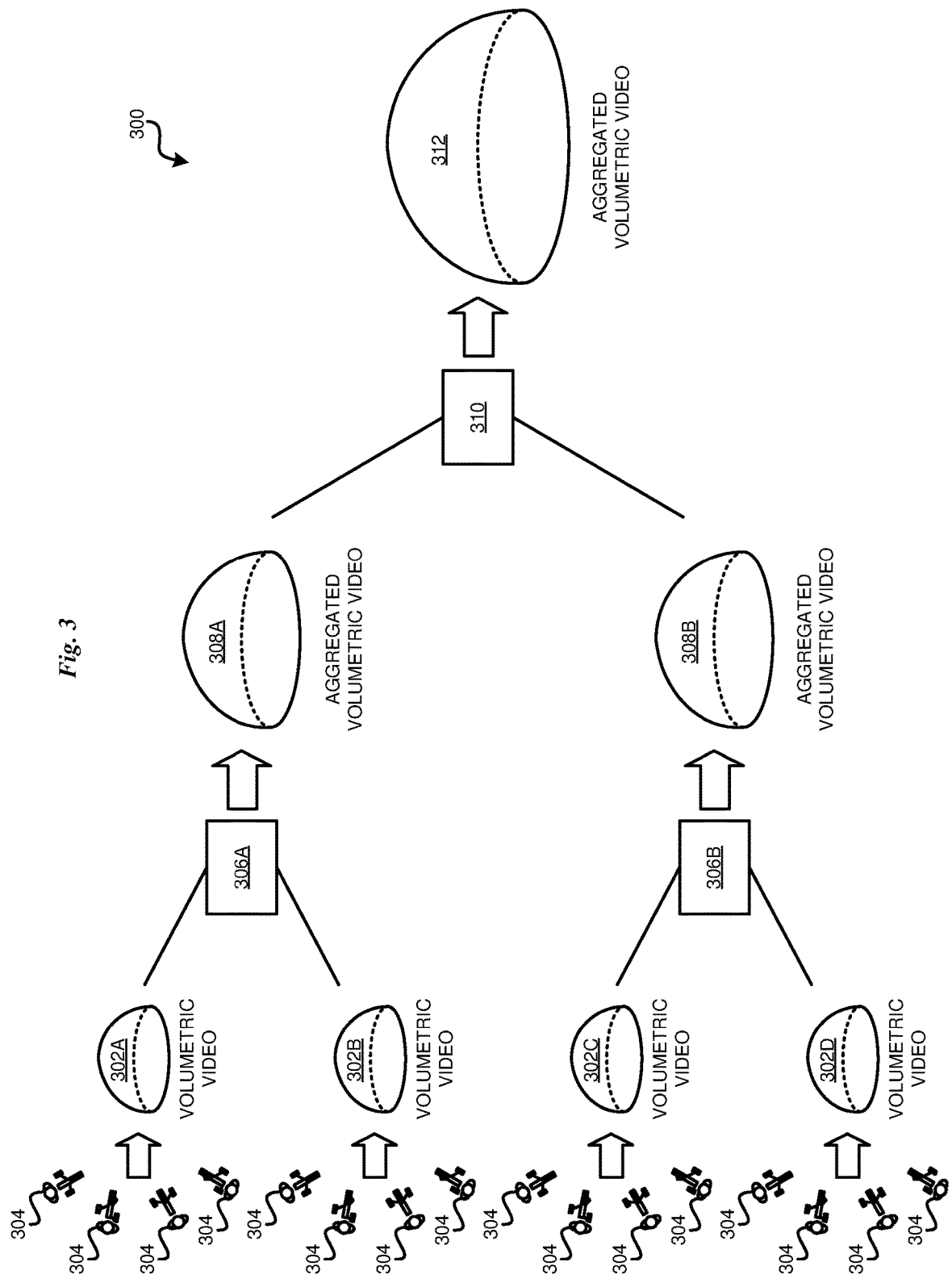
FIG. 3 depicts a functional block diagram of an exemplary video processing environment in accordance with an illustrative embodiment.

With reference to FIG. 3, this figure depicts a functional block diagram of an exemplary video processing environment 300 in accordance with an illustrative embodiment. In the illustrated embodiment, the video processing environment 300 includes server 306A, server 306B, and server 310 that each may include a volumetric video module 200 of FIGS. 1 and 2.

In the illustrated embodiment, the volumetric videos 302A-302D are examples of source volumetric videos. In the illustrated embodiment, the volumetric videos 302A-302D are each created using a plurality of cameras 304. Alternatively, one or more of the volumetric videos 302A-302D may be created using a single camera recording from multiple locations and angles.

The embodiment in FIG. 3 illustrates that, in addition to aggregating source videos (such as volumetric videos 302A-volumetric video 302D), disclosed embodiments may also aggregate aggregated volumetric videos. The illustrated embodiment also allows for aggregating more than two source volumetric videos.

In the illustrated embodiment, server 306A aggregates volumetric video 302A and volumetric video 302B into aggregated volumetric video 308A and server 306B aggregates volumetric video 302C and volumetric video 302D into aggregated volumetric video 308B. Then, server 310 aggregates aggregated volumetric video 308A and aggregated volumetric video 308B into aggregated volumetric video 312. In an alternative embodiment, an aggregated volumetric video may be aggregated using the source two-dimensional (2D) video and depth information from cameras 304 rather than from volumetric videos. For example, in some embodiments, the server 306A generates aggregated volumetric video 308A using 2D video and depth information from the cameras 304 associated with volumetric video 302A and from the cameras 304 associated with volumetric video 302B.

In another embodiment, an aggregated volumetric video may be further aggregated with another source volumetric video. For example, if nothing from the volumetric video 302D is needed for the aggregated volumetric video 312, then server 310 would aggregate aggregated volumetric video 308A with volumetric video 302C into aggregated volumetric video 312.

Figure 4:
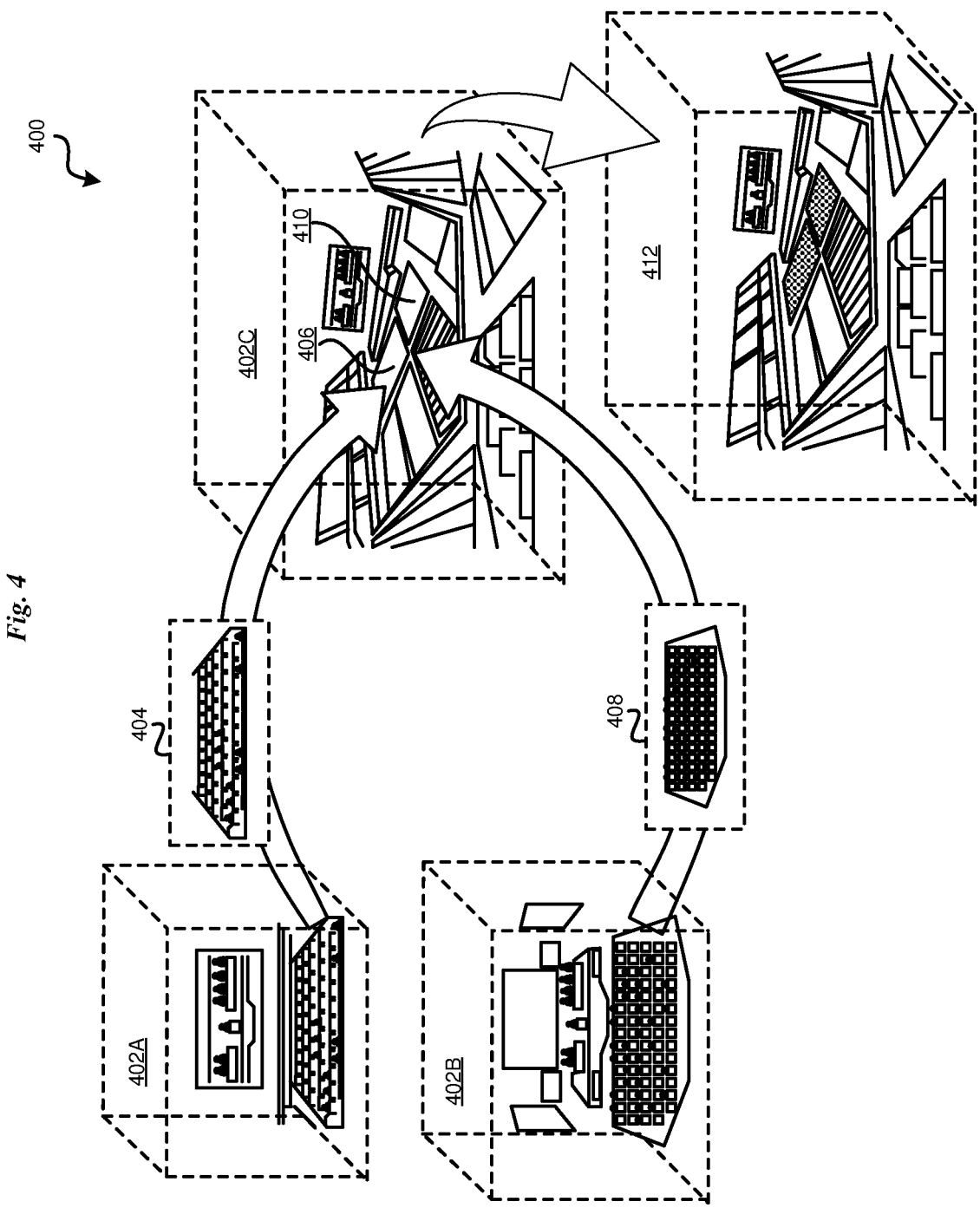
FIG. 4 depicts an aggregation process in accordance with an illustrative embodiment.

With reference to FIG. 4, this figure depicts an aggregation process 400 in accordance with an illustrative embodiment. In an embodiment, the aggregation process 400 is performed by the volumetric video module 200 of FIGS. 1 and 2.

The embodiment in FIG. 4 illustrates that, in addition to aggregating two volumetric videos (source or aggregated) at once, alternative embodiments may aggregate three or more volumetric videos (source or aggregated) at once. In the illustrated embodiment, user rules specified aggregating volumetric video 402A and volumetric video 402B with volumetric video 402C using primarily volumetric video 402C, but showing the audience in image portion 404 from volumetric video 402A and the audience in image portion 408 from volumetric video 402B in place of the audiences in insertion location 406 and insertion location 410 of volumetric video 402C.

Figure 5:
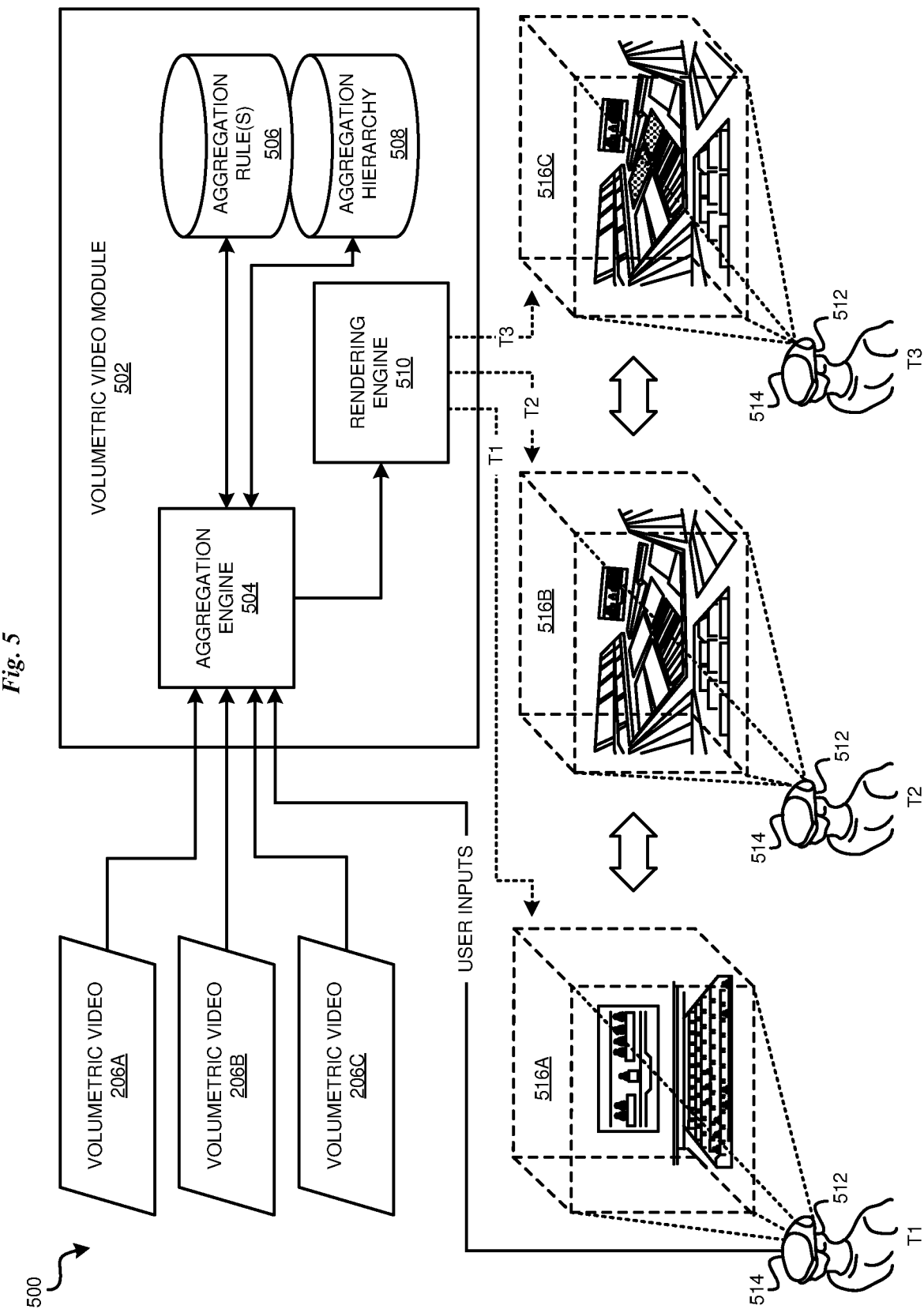
FIG. 5 depicts a functional block diagram of a volumetric video module in accordance with an illustrative embodiment.

With reference to FIG. 5, this figure depicts a functional block diagram of a volumetric video module 502 in accordance with an illustrative embodiment. The volumetric video module 502 is similar to the volumetric video module 200 of FIGS. 1 and 2, except that the aggregation engine 504 and rendering engine 510 of the volumetric video module 502 generate volumetric videos and/or aggregated volumetric videos of an aggregation hierarchy according to user navigation inputs.

For example, in the illustrated embodiment, a hierarchy of volumetric videos includes volumetric video 516A, volumetric video 516B, and aggregated volumetric video 516C. A user 514 at time T1 is using a headset 512 to view volumetric video 516A. The headset 512 includes, or is in communication with, the volumetric video module 502.

The aggregation engine 504 receives user inputs as well as one or more source volumetric videos 206A-206C. The aggregation engine 504 also has access to aggregation rule(s) 506 and to an aggregation hierarchy 508. The description of aggregation rule(s) 204 of FIG. 2 applies equally to aggregation rule(s) 506. The aggregation hierarchy 508 may be a playlist that specifies which volumetric videos to present and the order in which they should be presented. In some embodiments, a user 514 creates the aggregation hierarchy 508. In some embodiments, the volumetric video module 502 automatically generates the aggregation hierarchy 508 according to user-specified rules or preferences (e.g., play source volumetric videos on order from closest recording location to furthest then play aggregated).

In the illustrated embodiment, the headset 512 may include controls to allow for simple next/previous navigation of the aggregation hierarchy 508. These controls send user inputs to the aggregation engine 504. The aggregation engine 504 checks the aggregation hierarchy 508, then directs the rendering engine 510 to transmit the appropriate volumetric video. Thus, in the illustrated embodiment, the aggregation hierarchy 508 includes volumetric video 516A, followed by volumetric video 516B, followed by aggregated volumetric video 516C, such that the user 514 selecting "next" from time T1 will next see volumetric video 516B at time T2, and if the user selects "next" again, the user will see aggregated volumetric video 516C at time T3. The user may also navigate back, for example to go from aggregated volumetric video 516C back to volumetric video 516B, and so on.

Figure 6:
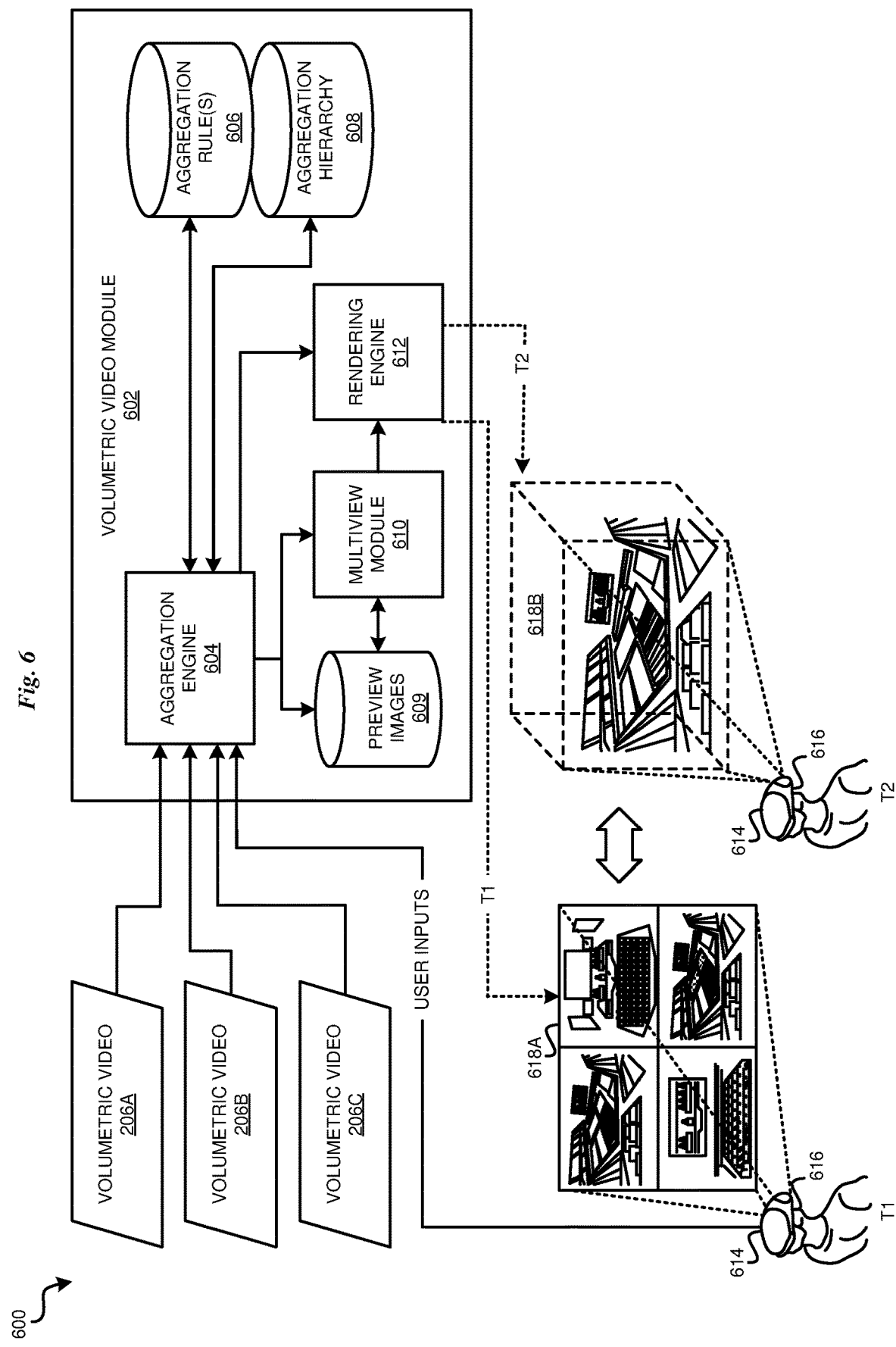
FIG. 6 depicts a functional block diagram of a volumetric video module in accordance with an illustrative embodiment.

With reference to FIG. 6, this figure depicts a functional block diagram of a volumetric video module 602 in accordance with an illustrative embodiment. The volumetric video module 602 is similar to the volumetric video module 200 of FIGS. 1 and 2, except that the volumetric video module 602 includes a multiview module 610 that uses preview images 609 to generate a multiview image 618A.

A multiview image 618A includes a display of two or more available volumetric videos that can be used as a menu by the user to select a volumetric video to view. For example, in the illustrated embodiment, the volumetric video module 602 receives source volumetric videos 206A-206C and generates a fourth volumetric video that is an aggregation of the three source volumetric videos 206A-206C. Thus, the volumetric video module 602 has four possible volumetric videos from which the user 614 may choose. The user, viewing through the use of a headset 616, is presented with a multiview image 618A that is created by the multiview module 610 using preview images 609 from each of the four available volumetric videos. The multiview image 618A allows the user 614 to select one of the available volumetric videos by selecting the corresponding preview image in the multiview image 618A. For example, if the user selects the top left box, this selection is sent as a user input to the aggregation engine 604. The aggregation engine 604 then provides the volumetric video data for the selected volumetric video to the rendering engine 612. The rendering engine 612 then renders the volumetric video (in this example, volumetric video 618B was selected) at the headset 616 of the user 614.

Figure 7:
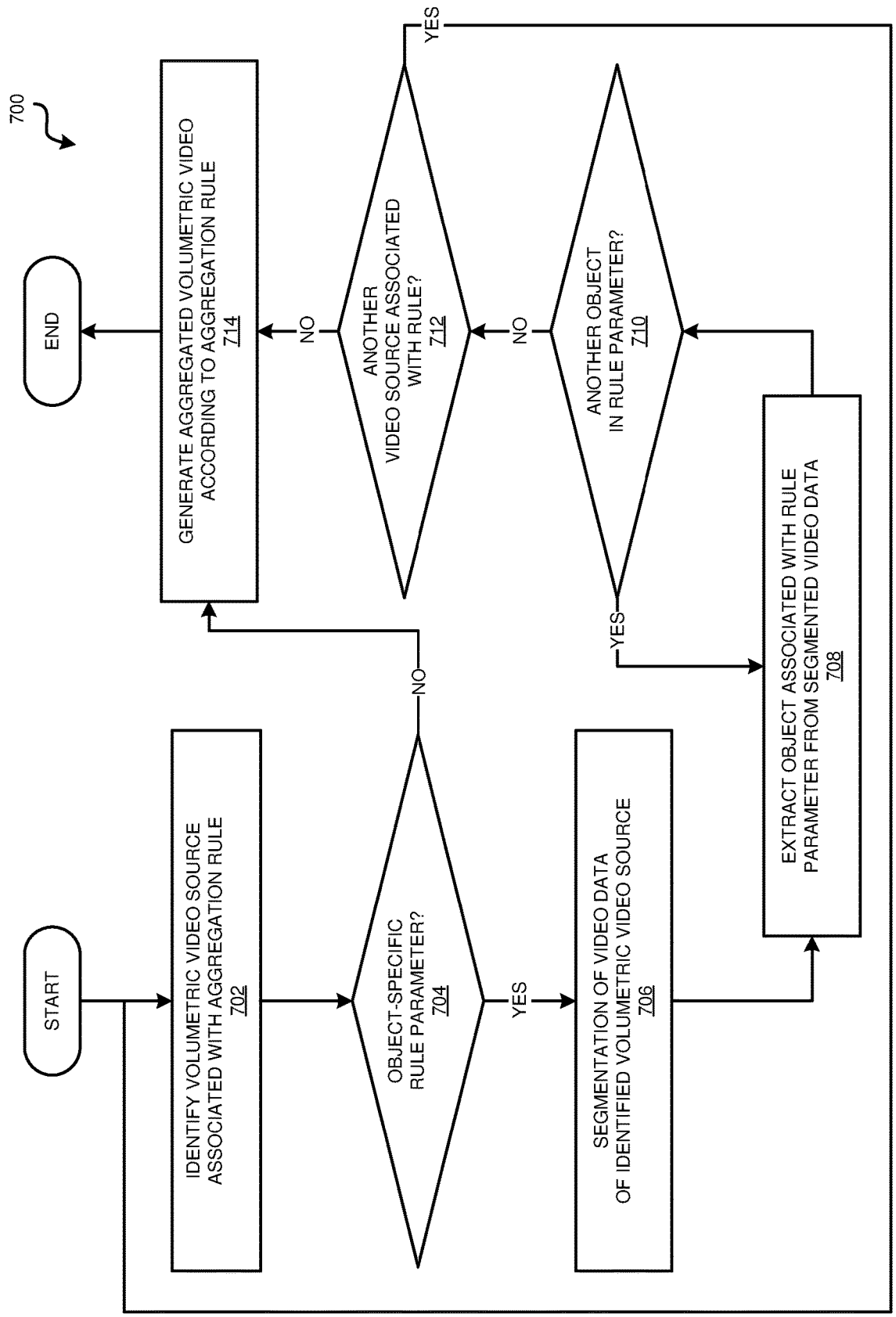
FIG. 7 depicts a flowchart of an example process for aggregating volumetric videos in accordance with an illustrative embodiment.

With reference to FIG. 7, this this figure depicts a flow-chart of an example process 700 for aggregating volumetric videos in accordance with an illustrative embodiment. In a particular embodiment, the volumetric video module 200 of FIG. 2, volumetric video module 502 of FIG. 5, or volumetric video module 602 of FIG. 6 carries out the process 700.

In the illustrated embodiment, at Next, at block 702, the process identifies volumetric video sources associated with aggregation rule. Next, at block 704, the process determines if the aggregation rule applies to any specific objects in the video. If so, then at block 706, the process segments the video data of identified volumetric video source. Next, at block 708, the process extracts the object specified by the aggregation rule from segmented video data, for example so that the object can be included in the aggregated volumetric video generated at block 714. First, however, the process checks for other objects specified by the rule (block 710) and for additional volumetric video sources to process (block 712). Once all volumetric video sources have been processed for objects specified by the aggregation rules, the process continues to block 714. At block 714, the process generates the aggregated volumetric video according to the aggregation rule(s), i.e., to include the specified objects extracted from the individual volumetric video sources.

With reference to FIG. 8, this this figure depicts a flowchart of an example process 800 for aggregating volumetric videos using an aggregation optimization technique in accordance with an illustrative embodiment. In a particular embodiment, the volumetric video module 200 of FIG. 2, volumetric video module 502 of FIG. 5, or volumetric video module 602 of FIG. 6 carries out the process 800.

In the illustrated embodiment, at block 802, the process retrieves an aggregation rule for a user who is requesting an aggregated volumetric video. Next, at block 804, the process compares the requesting-user aggregation rule to a set of aggregation rules of other users. Specifically, the process searches for matching aggregation rules of another user for whom an aggregated video is already being processed or generated. Next, at block 806, if a matching rule is found, the process performs an optimization technique in which the process provides the requesting user with the aggregated video corresponding to the matched rule. This prevents redundant aggregation processing and thereby reduces the workload of the systems involved. If no matching rule is found at block 806, the process generates an aggregated volumetric video according to requesting user's aggregation rule, for example according to the process 700 of FIG. 7.

With reference to FIG. 9, this this figure depicts a flowchart of an example process 900 for aggregating volumetric videos using a security technique in accordance with an illustrative embodiment. In a particular embodiment, the volumetric video module 200 of FIG. 2, volumetric video module 502 of FIG. 5, or volumetric video module 602 of FIG. 6 carries out the process 900.

In the illustrated embodiment, at block 902, the process identifies volumetric video sources associated with an aggregated video request from requesting user. Next, at block 904, the process compares a permission rule associated with the requesting user to access rules for each of the identified video sources. At block 906, the process determines whether the requesting user is authorized to view the identified video sources. If the user is not authorized to view all of the identified video sources, the request is denied at block 910. Otherwise, at block 908, the process generates an aggregated volumetric video according to requesting user's aggregation rule, for example according to the process 700 of FIG. 7.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
selecting, using a first attribute of a first object, the first object in a first volumetric video;
selecting, using a second attribute of a second object, the second object in a second volumetric video, wherein the first attribute and the second attribute satisfy an aggregation rule;
generating an aggregated volumetric video from the first volumetric video and the second volumetric video, wherein the generating of the aggregated video comprises rendering the first object and the second object simultaneously in the aggregated volumetric video based on the aggregation rule;
detecting a user input from a user indicative of a selection of the first volumetric video; and
determining whether the user is authorized to view the first volumetric video by comparing a permission rule associated with the user to an access rule associated with the first volumetric video, wherein the generating of the aggregated volumetric video is responsive to determining that the user is authorized to view the first volumetric video.

2. The method of claim 1, wherein the selecting of the first object in the first volumetric video comprises using an instance segmentation process, wherein the instance segmentation process comprises classifying a first portion of the first volumetric video as being representative of the first object having the first attribute.

3. The method of claim 2, wherein instance segmentation process further comprises:
extracting an image segment from a frame of the first volumetric video;
classifying the extracted image segment using a trained machine-learning based image classifier, wherein the image classifier outputs a segment classification in response to receiving the extracted image segment;
determining that the segment classification output from the image classifier is associated with the first object having the first attribute;
designating, responsive to determining that the segment classification is associated with the first object having the first attribute, the extracted image segment as a depiction of at least some of the first object such that the first portion of the first volumetric video comprises the extracted image segment.

4. The method of claim 2, further comprising:
extracting the first portion of the first volumetric video from frames of the first volumetric video; and
inserting the thus extracted first portion of the first volumetric video into frames of a third volumetric video.

5. The method of claim 4, further comprising:
extracting a second portion of the second volumetric video from frames of the second volumetric video, wherein the second portion is representative of the second object having the second attribute; and
inserting the thus extracted second portion of the second volumetric video into frames of a third volumetric video.

6. The method of claim 1, further comprising:
transmitting the aggregated volumetric video to a user device;
detecting a user input indicative of a selection of the first volumetric video; and
transitioning, responsive to the user input, from transmitting the aggregated volumetric video to the user device to transmitting the first volumetric video to the user device.

7. The method of claim 1, further comprising:
transmitting a multiview selection image to a user device, wherein the multiview selection image comprises a preview image associated with the aggregated volumetric video;
detecting a user input indicative of a selection of the preview image; and
transmitting, responsive to the user input, the aggregated volumetric video to the user device.

8. The method of claim 1, further comprising:
comparing a first set of aggregation rules associated with a first user to a second set of aggregation rules associated with a second user;
detecting that the first set of aggregation rules matches the second set of aggregation rules, wherein the first set of aggregation rules and the second set of aggregation rules both include said aggregation rule; and
transmitting, responsive to detecting that the first set of aggregation rules matches the second set of aggregation rules, the aggregated volumetric video to the first user and to the second user.

9. The method of claim 8, further comprising:
designating, responsive to detecting that the first set of aggregation rules matches the second set of aggregation rules, the first user and the second user for collective aggregation processing.

10. The method of claim 9, further comprising:
transmitting, responsive to designating the first user and the second user for collective aggregation processing, the aggregated volumetric video to a first user device associated with the first user and to a second user device associated with the second user.

11. A computer program product comprising one or more computer readable storage media, and program instructions collectively stored on the one or more computer readable storage media, the program instructions executable by a processor to cause the processor to perform operations comprising:
selecting, using a first attribute of a first object, the first object in a first volumetric video;
selecting, using a second attribute of a second object, the second object in a second volumetric video, wherein the first attribute and the second attribute satisfy an aggregation rule;
generating an aggregated volumetric video from the first volumetric video and the second volumetric video, wherein the generating of the aggregated video comprises rendering the first object and the second object simultaneously in the aggregated volumetric video based on the aggregation rule;
detecting a user input from a user indicative of a selection of the first volumetric video; and
determining whether the user is authorized to view the first volumetric video by comparing a permission rule associated with the user to an access rule associated with the first volumetric video, wherein the generating of the aggregated volumetric video is responsive to determining that the user is authorized to view the first volumetric video.

12. The computer program product of claim 11, wherein the stored program instructions are stored in a computer readable storage device in a data processing system, and wherein the stored program instructions are transferred over a network from a remote data processing system.

13. The computer program product of claim 11, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
   program instructions to meter use of the program instructions associated with the request; and
program instructions to generate an invoice based on the metered use.

14. The computer program product of claim 11, the operations further comprising:
   transmitting the aggregated volumetric video to a user device;
   detecting a user input indicative of a selection of the first volumetric video; and
   transitioning, responsive to the user input, from transmitting the aggregated volumetric video to the user device to transmitting the first volumetric video to the user device.

15. The computer program product of claim 11, the operations further comprising:
   transmitting a multiview selection image to a user device, wherein the multiview selection image comprises a preview image associated with the aggregated volumetric video;
   detecting a user input indicative of a selection of the preview image; and
   transmitting, responsive to the user input, the aggregated volumetric video to the user device.

16. A computer system comprising a processor and one or more computer readable storage media, and program instructions collectively stored on the one or more computer readable storage media, the program instructions executable by the processor to cause the processor to perform operations comprising:
   selecting, using a first attribute of a first object, the first object in a first volumetric video;
   selecting, using a second attribute of a second object, the second object in a second volumetric video, wherein the first attribute and the second attribute satisfy an aggregation rule;
   generating an aggregated volumetric video from the first volumetric video and the second volumetric video, wherein the generating of the aggregated video comprises rendering the first object and the second object simultaneously in the aggregated volumetric video based on the aggregation rule;
   detecting a user input from a user indicative of a selection of the first volumetric video; and
   determining whether the user is authorized to view the first volumetric video by comparing a permission rule associated with the user to an access rule associated with the first volumetric video, wherein the generating of the aggregated volumetric video is responsive to determining that the user is authorized to view the first volumetric video.

* * * * *